G. BURKHARDT.
Soldering-Iron Heater.
No. 88,271.  Patented March 30, 1869.
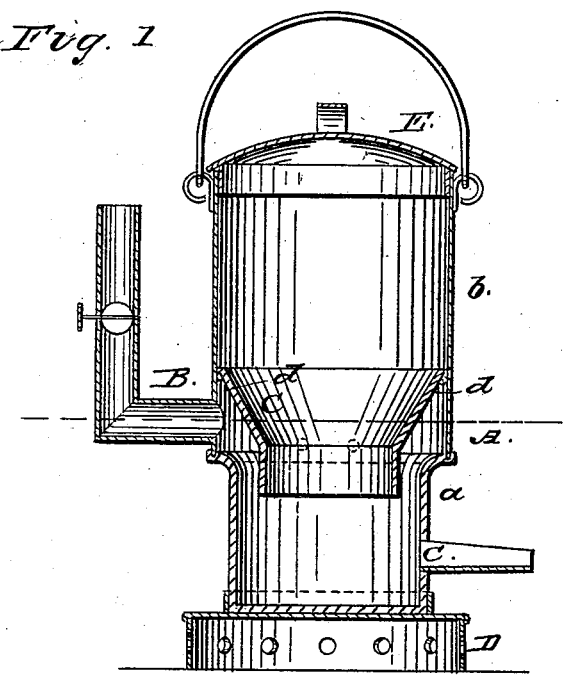
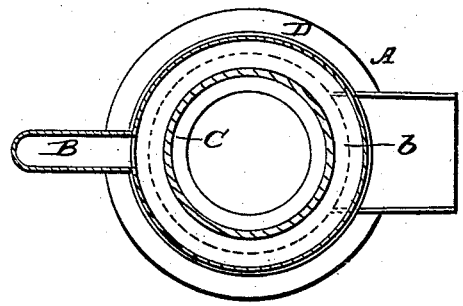
Witnesses
Ernest F. Kastenhuber
Chas Wahlers
Inventor
G. Burkhardt
per
Van Santvoord & Huff
Attys

United States Patent Office.

GUSTAV BURKHARDT, OF HOMER, ILLINOIS.

Letters Patent No. 88,271, dated March 30, 1869.

IMPROVEMENT IN "TINKERS' POT."

The Schedule referred to in these Letters Patent and making part of the same.

*To all whom it may concern:*

Be it known that I, GUSTAV BURKHARDT, of Homer, in the county of Champaign, State of Illinois, have invented a new and improved Tinkers' Pot; and I do hereby declare the following to be a full, clear, and exact description thereof, which will enable those skilled in the art to make and use the same, reference being had to the accompanying drawing, forming part of this specification, in which drawing—

Figure 1 represents a vertical central section of this invention.

Figure 2 is a horizontal section thereof.

Similar letters indicate corresponding parts.

This invention consists in the arrangement of a funnel-shaped partition in the interior of a tinkers' pot, between the air-supply opening and the smoke-pipe, in such a manner, that by said partition, the burning coals in the lower part of the pot are separated from the coals in the upper part thereof, and by these means the coals are gradually ignited as they descend, and a great economy in fuel is effected without impairing the heating-effect of the pot.

A represents an ordinary tinkers' pot, the bottom part $a$ of which is made of cast-iron, while its top part, $b$, may be made of sheet-iron, as shown.

The bottom part $a$ forms the fire-pot, which is provided with an aperture, $c$, through which the soldering-irons are introduced, and which also serves to admit the requisite amount of air to support the combustion.

B is the smoke-pipe, which emanates from the lower portion of the top part $b$, on the side opposite the aperture $c$.

In the interior of the top part $b$, of the pot A, close above the opening leading to the smoke-pipe, is secured a ring, $e$, which serves to support the funnel-shaped partition C, so that the fuel, which is fed down through the top part $b$ of the pot A, has to pass through the funnel C, before it reaches the bottom part $a$.

A cover, E, serves to cover up the pot after the fuel has been introduced.

By the action of the funnel-shaped partition, the burning coals in the bottom part of the pot A are separated from the coals in the upper part of said pot, and the fire is confined to the bottom part $a$, just where it is required, while the coals feed themselves gradually down, as required, to keep up the fire, and thereby a considerable economy in fuel is effected without reducing the heating-capacity of the pot. The draught of the fire may be increased by holes in the sides of the pot, and it can be regulated.

If desired, the bottom of the pot A may be perforated, or made in the shape of a grate, so that the ashes can be raked out from below.

The funnel-shaped partition C is made movable, so that it can be taken out for the purpose of cleaning the interior of the pot.

The pot is supported by a perforated rim, D, so that its bottom is prevented from coming in direct contact with the ground, and that when said bottom is perforated, a space is formed to receive the ashes.

I am aware of the patent granted to Warner Hatch, dated November 3, 1868, for a furnace for heating soldering-irons, but I do not claim anything shown by him.

Having thus described my invention,

What I claim as new, and desired to secure by Letters Patent, is—

1. The removable funnel C, forming an automatic fuel-supply, supported on the ring $d$, so as to leave a space between it and the body A $a$ of the pot, substantially as and for the purpose herein set forth.

2. The tinkers' pot composed of the removable funnel C, fuel-reservoir A $b$, with ring $d$, cover E, and pipe B, and the cast fire-pot $a$, supported on perforated ring D, and provided with an opening, $c$, all combined and arranged substantially as herein described.

GUSTAV BURKHARDT.

Witnesses:
SOLOMON PLANT,
WILLIAM STRAUSS.